United States Patent
Yamagata

(10) Patent No.: US 6,774,902 B2
(45) Date of Patent: Aug. 10, 2004

(54) MEMORY CONTROL APPARATUS AND METHOD

(75) Inventor: Shigeo Yamagata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 301 days.

(21) Appl. No.: 10/025,813

(22) Filed: Dec. 26, 2001

(65) Prior Publication Data

US 2002/0085009 A1 Jul. 4, 2002

(30) Foreign Application Priority Data

Dec. 28, 2000 (JP) .................................... 2000-402714
Dec. 14, 2001 (JP) .................................... 2001-381696

(51) Int. Cl.$^7$ ................................................ G09G 5/39
(52) U.S. Cl. ....................... 345/531; 345/658; 382/297; 382/305; 358/1.1; 358/444
(58) Field of Search ........................... 345/531, 501, 345/540, 564, 572, 649, 658, 643; 382/296, 297, 305; 358/1.1, 1.2, 1.16, 1.17, 443, 444

(56) References Cited

U.S. PATENT DOCUMENTS 5,124,692 A * 6/1992 Sasson ...................... 345/658
5,313,567 A * 5/1994 Civanlar et al. ............ 345/643
6,330,374 B1 * 12/2001 Yamaguchi et al. ........ 382/297

* cited by examiner

*Primary Examiner*—Kee M. Tung
(74) *Attorney, Agent, or Firm*—Fitzpatrick, Cella, Harper & Scinto

(57) ABSTRACT

In this invention, an effective pixel count (N) in a horizontal direction of original image data is calculated, and whether this calculated effective pixel count (N) is a natural number multiple of the number (B) of banks is checked. If it is determined that the effective pixel count (N) is a natural number multiple of the number (B) of banks, original image data to which invalid image data is added in the horizontal direction is written in a memory. Since this prevents continuous access from the same bank during memory read, high-speed data access is possible even when original image data is rotated.

24 Claims, 16 Drawing Sheets

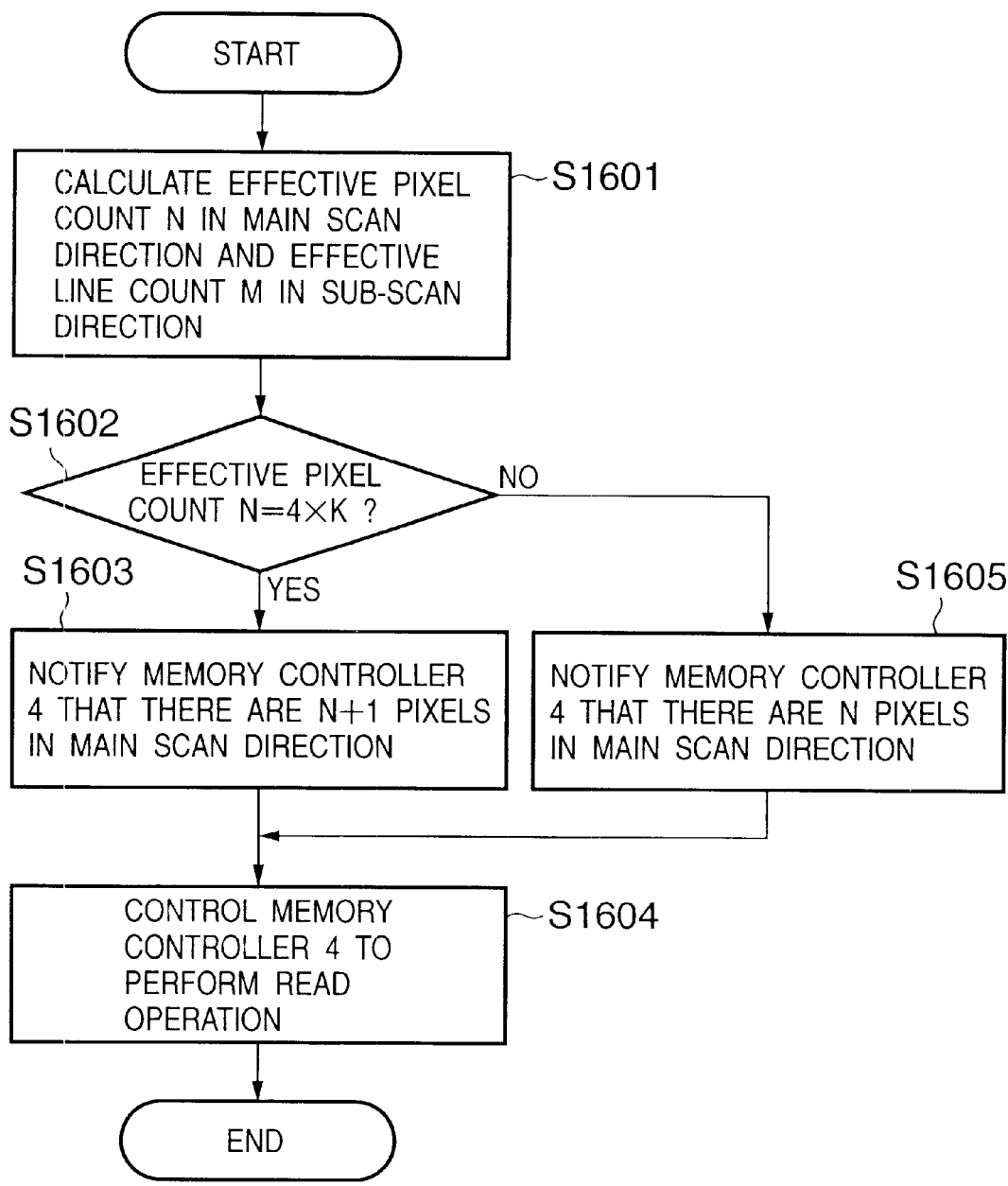

MEMORY CONTROL APPARATUS AND METHOD

FIELD OF THE INVENTION

The present invention relates to a memory control apparatus and method which write image data into a memory having a plurality of banks by interleaving, and read out the image data from the memory in an address sequence different from that in the data write.

BACKGROUND OF THE INVENTION

Some image output apparatuses such as copying apparatuses have a memory called an image memory for storing image data. A dynamic RAM (DRAM) has been conventionally used as an image memory for use in such apparatuses.

Recently, however, with the increasing resolution and transfer rate of image data, it is becoming necessary to increase the rates at which image data is input to and output from an image memory. As a DRAM meeting this requirement of high speed, a synchronous DRAM (to be referred to as an "SDRAM" hereinafter) is attracting attention. This SDRAM has a plurality of memory areas (to be referred to as "banks" hereinafter) in the same chip, and these banks can be accessed as they are switched, i.e., these banks can be interleaved.

Since a plurality of banks of the SDRAM are accessed while they are alternately interleaved, the access time can be shortened compared to a DRAM in which a single bank is continuously accessed. Therefore, the SDRAM is a memory capable of high-speed data transfer.

"Rotational output" by which the output direction of image data is rotated in accordance with the original size is one function of an image output apparatus such as a copying apparatus. This output function is used when no copying sheet optimum for the original size is set or when a plurality of original images are to be laid out on the same output sheet. For example, when an A4-size original is set on an original glass plate and there is no A4-size sheet, the scanned original image data is rotated 90° and output onto an A4R sheet.

Unfortunately, when rotation control is to be performed for this rotational output of image data, image data written in an image memory must be read out in an address sequence different from that in the data write. Even when high-speed write is realized by writing image data into the SDRAM as an image memory by interleaving banks of this SDRAM, the same bank may be continuously accessed during data read. This prolongs the access time of memory read during the rotation control.

SUMMARY OF THE INVENTION

The present invention has been made to solve the above problem, and has as its object to provide a memory control apparatus and method which can prevent continuous access from the same bank during memory read, and which thereby allow high-speed data access even when original image data is rotated.

As a means for achieving the above object, the present invention includes a memory control apparatus for writing image data into a memory having a plurality of banks by interleaving, and reading out the image data from the memory in an address sequence different from the address sequence of write, comprising: calculating means for calculating an effective pixel count (N) in a horizontal direction of original image data; determining means for determining whether the effective pixel count (N) calculated by the calculating means is a natural number multiple of the number (B) of the banks; and write control means for performing control such that original image data to which invalid image data is added in the horizontal direction is written in the memory, if the determining means determines that the effective pixel count (N) is a natural number multiple of the number (B) of the banks.

It is another object of the present invention to provide a memory control apparatus and method which can prevent alternate access from two banks during memory read, and which thereby allow high-speed data access even when original image data is rotated.

As a means for achieving the above object, the present invention includes a memory control apparatus for writing image data into a memory having a plurality of banks by interleaving, and reading out the image data from the memory in an address sequence different from the address sequence of write, comprising: calculating means for calculating an effective pixel count (N) in a horizontal direction of original image data; determining means for determining whether the effective pixel count (N) calculated by the calculating means satisfies a relation $N = B \times K + B/2$ (K: natural number, B: the number of banks); and write control means for performing control such that original image data to which invalid image data is added in the horizontal direction is written in the memory, if the determining means determines that the relation $N = B \times K + B/2$ holds.

It is still another object of the present invention to provide a memory control apparatus and method which can prevent continuous access from the same bank and can interleave during memory read, and which thereby allow high-speed data access even when original image data is rotated.

As a means for achieving the above object, the present invention includes a memory control apparatus for writing image data into a memory having a plurality of banks by interleaving, and reading out the image data from the memory in an address sequence different from the address sequence of write, comprising: determining means for determining, when original image data is written in the memory, whether bank addresses in each of pixel columns arranged in a horizontal direction are the same in a vertical direction; and address control means for performing address control, if the determining means determines that bank addresses in each of the pixel columns arranged in the horizontal direction are the same in the vertical direction, such that the original image data is written while the bank addresses are switched in the vertical direction.

The present invention has been made to solve the above problem, and has as its object to provide an image input/output control apparatus and an information notification method which can prevent continuous access from the same bank during memory read without exchanging any complicated signals with a memory controller, and which thereby can readily execute high-speed data access even when original image data is rotated.

As a means for achieving the above object, the present invention includes an image input/output control apparatus which is connected to a memory control apparatus for writing image data into a memory having a plurality of banks by interleaving, and reading out the image data from the memory in an address sequence different from the address sequence of write, and which notifies the memory control apparatus of information for accessing the memory, comprising: calculating means for calculating an effective pixel count (N) in a horizontal direction of original image data; determining means for determining whether the effective pixel count (N) calculated by the calculating means is a natural number multiple of the number (B) of the banks; and notifying means for notifying the memory control apparatus that the pixel count in the horizontal direction of the original image data is N+C ($1 \leq C < B$, C: natural number), if the determining means determines that the effective pixel count (N) is a natural number multiple of the number (B) of the banks.

The present invention has been made to solve the above problem, and has as its object to provide a copying apparatus and a memory control method of the copying apparatus which can prevent continuous access from the same bank during memory read, and which thereby can avoid data access delay during rotation control of read image data.

As a means for achieving the above object, the present invention includes a copying apparatus having: a reader for reading image data; a synchronous DRAM for storing the image data read by the reader into B banks; a memory controller for rotating image data through +90° or −90° by sequentially writing the image data into a memory having a plurality of banks by interleaving, and reading out the image data from the memory in an address sequence different from the address sequence of write; and an output unit for printing out the image data rotated +90° or −90° by the memory controller, comprising: calculating means for calculating an effective pixel count (N) in a main scan direction of read image data read by the reader; determining means for determining whether the effective pixel count (N) calculated by the calculating means satisfies a relation N=B×K (K is a natural number), as to the number (B) of banks of a synchronous DRAM; and access control means for controlling memory access to the memory controller, if the determining means determines that the effective pixel count (N) satisfies the relation N=B×K (K is a natural number), such that the read image data is stored in the synchronous DRAM while C ($1 \leq C < B$, C: natural number) invalid pixels are added to an end of the read image data.

It is still another object of the present invention to provide a copying apparatus and a memory control method of the copying apparatus which can prevent alternate access from two banks, and which thereby can avoid data access delay during rotation control of read image data.

As a means for achieving the above object, the present invention includes a copying apparatus having: a reader for reading image data; a synchronous DRAM for storing the image data read by the reader into B banks; a memory controller for rotating image data through +90° or −90° by sequentially writing the image data into a memory having a plurality of banks by interleaving, and reading out the image data from the memory in an address sequence different from the address sequence of write; and an output unit for printing out the image data rotated +90° or −90° by the memory controller, comprising: calculating means for calculating an effective pixel count (N) in a main scan direction of read image data read by the reader; determining means for determining whether the effective pixel count (N) calculated by the calculating means satisfies a relation N=B×K+B/2 (K is a natural number), as to the number (B) of banks of a synchronous DRAM; and access control means for controlling memory access to the memory controller, if the determining means determines that the effective pixel count (N) satisfies the relation N=B×K+B/2 (K is a natural number), such that the read image data is stored in the synchronous DRAM while C ($1 \leq C < B$, C: natural number) invalid pixels are added to an end of the read image data.

The present invention has been made to solve the above problem, and has as its object to provide a copying apparatus and a memory control method for the copying apparatus which can prevent the delay in data access in rotation control of read image data because continuous access from the same bank during memory read can be prevented.

As a means for achieving the above object, the present invention includes a memory control apparatus for writing image data into a memory having a plurality of banks by interleaving, and reading out the image data from the memory in an address sequence different from the address sequence of write, comprising: calculating means for calculating an effective pixel count (N) in a horizontal direction of original image data; determining means for determining whether the effective pixel count (N) calculated by the calculating means is a natural number multiple of the number (B) of the banks; and write control means for controlling a relationship between a write address of final effective image data in the horizontal direction and a write address of next start effective image data in the horizontal direction, if the determining means determines that the effective pixel count (N) is a natural number multiple of the number (B) of the banks.

The present invention has been made to solve the above problem, and has as its object to provide a copying apparatus and a memory control method for the copying apparatus which can prevent the delay in data access in rotation control of read image data because alternate access from two banks during memory read can be prevented.

As a means for achieving the above object, the present invention includes an image input/output control apparatus which is connected to a memory control apparatus for writing image data into a memory having a plurality of banks by interleaving, and reading out the image data from the memory in an address sequence different from the address sequence of write, and which notifies the memory control apparatus of information for accessing the memory, comprising: calculating means for calculating an effective pixel count (N) in a horizontal direction of original image data; determining means for determining whether the effective pixel count (N) calculated by the calculating means is a natural number multiple of the number (B) of the banks; and notifying means for notifying the memory control apparatus that a sum in calculating a write address of next start effective image data in the horizontal direction is C ($2 \leq C \leq B$, C: natural number) with respect to a write address of final effective image data in the horizontal direction, if the determining means determines that the effective pixel count (N) is a natural number multiple of the number (B) of the banks.

Further objects, features and advantages of the present invention will become apparent from the following detailed description of embodiments of the present invention with reference to the accompanying drawings.

BRIEF DESCRIPTION OF THE DRAWINGS

The above objects of the present invention will be apparent from the following drawings and a detailed explanation based on the drawings.

FIG. 16 is a flow chart for explaining a rotational printing process in the second embodiment.

DETAILED DESCRIPTION OF THE PREFERRED EMBODIMENTS

Preferred embodiments of the present invention will now be described in detail in accordance with the accompanying drawings.

First Embodiment

Figure 1:
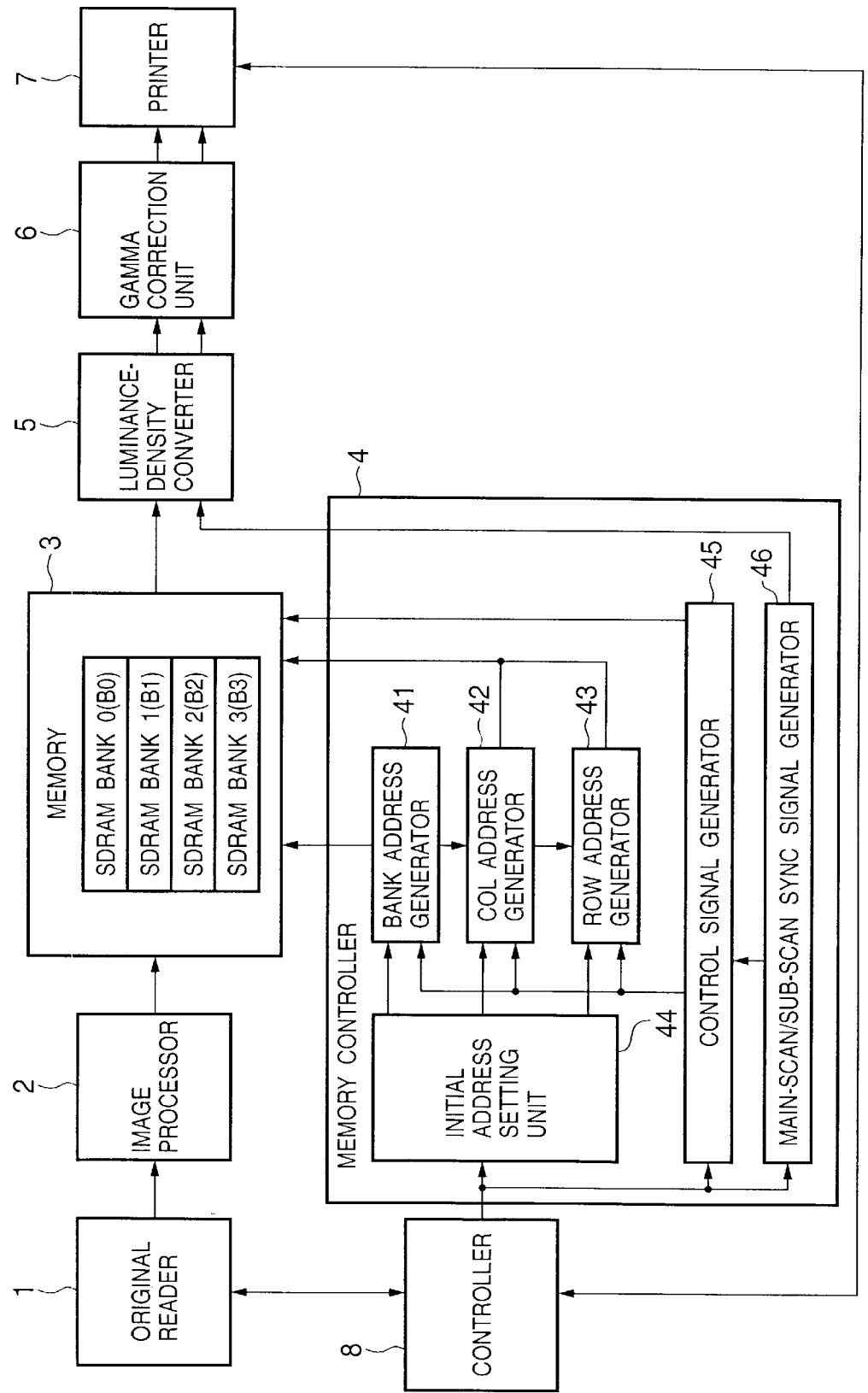
FIG. 1 is a block diagram showing a copying apparatus according to an embodiment of the present invention.

FIG. 1 is a block diagram of a copying apparatus according to the first embodiment of the present invention. In FIG. 1, reference numeral 1 denotes an image reader; 2, an image processor; 3, a memory; 4, a memory controller; 5, a luminance-density converter; 6, a gamma correction unit; 7, a printer; and 8, a controller.

The operation of memory control in this first embodiment will be described in detail below with reference to FIG. 1. The image reader 1 has a CCD line sensor, lamp, and mirror optical system. The size of an original set on an original glass plate is sensed by an optical sensor placed beforehand, and information of the sensed original size is output to the controller 8 (to be described later). Also, the set original is read by the CCD line sensor, and the photoelectrically converted original image data is output to the image processor 2.

In this apparatus, the longitudinal direction of the CCD line sensor is a main scan direction, and a direction perpendicular to the longitudinal direction of this CCD line sensor is a sub-scan direction. Control is so performed that the mirror optical system scans in the sub-scan direction to read the entire surface of an original set on the original glass plate.

The controller 8 (to be described later) calculates the size of an original image from the output original size information from the original reader 1, and calculates an effective pixel count (N) in the main scan direction and an effective line count (M) in the sub-scan direction. The controller 8 outputs sync signals indicating an effective image region to the image reader 1 and the memory controller 4, and controls the image reader 1 to read out the effective image data.

Figure 2:
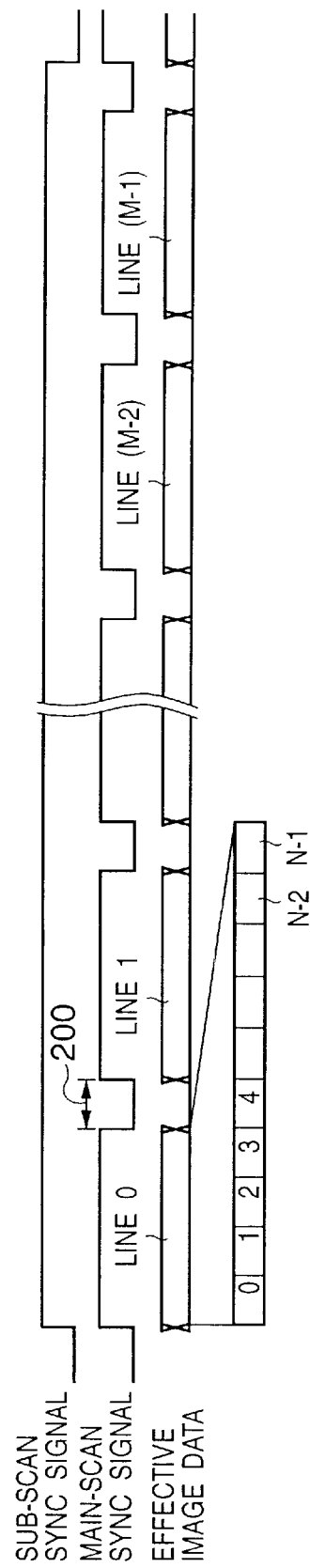
FIG. 2 is a timing chart showing main-scan and sub-scan sync signals and effective image data.

FIG. 2 shows the relationship between the output sync signals from the image reader 1 and the image data. Referring to FIG. 2, a period in which a sub-scan sync signal is 'High' and a main-scan sync signal is 'High' is the effective image data period. Image data of N pixels and image data of M lines are output during one main-scan sync period and one sub-scan sync period, respectively, corresponding to the effective pixel region calculated by the controller 8. This data output is controlled by the controller 8.

In FIG. 2, invalid pixel regions 200 of a plurality of pixel sync periods are set as intervals of the main-scan sync signals.

The original reader 1 reads image data of a predetermined effective pixel region, and the read image data is input to the image processor 2. The image processor 2 performs shading correction for the read image data, and outputs the corrected image data to the memory 3. This memory 3 is an SDRAM including four banks. The memory 3 stores the input image data from the image processor 2, reads out the stored image data, and outputs the data to the luminance-density converter 5. The memory controller 4 controls the data storage and read with respect to the memory 3.

In the block diagram of FIG. 1, reference numeral 41 denotes a bank address generator; 42, a COL address generator; and 43, a ROW address generator. An initial address generator 44 sets initial addresses in the bank address generator 41, the COL address generator 42, and the ROW address generator 43. A control signal generator 45 controls the operations of the bank address generator 41, the COL address generator 42, and the ROW address generator 43, and controls the memory write and read operations of the memory 3. Reference numeral 46 denotes the main-scan/sub-scan sync signal generator described above. The operation of the control signal generator 45 is controlled by the output sync signals from this main-scan/sub-scan sync signal generator 46.

The main-scan/sub-scan sync signal generator 46 also outputs main-scan and sub-scan sync signals indicative of the effective image period of an image data signal read out from the memory 3. Note that the controller 8 controls the operations of the initial address generator 44, the control signal generator 45, and the main-scan/sub-scan sync signal generator 46.

Figure 3:
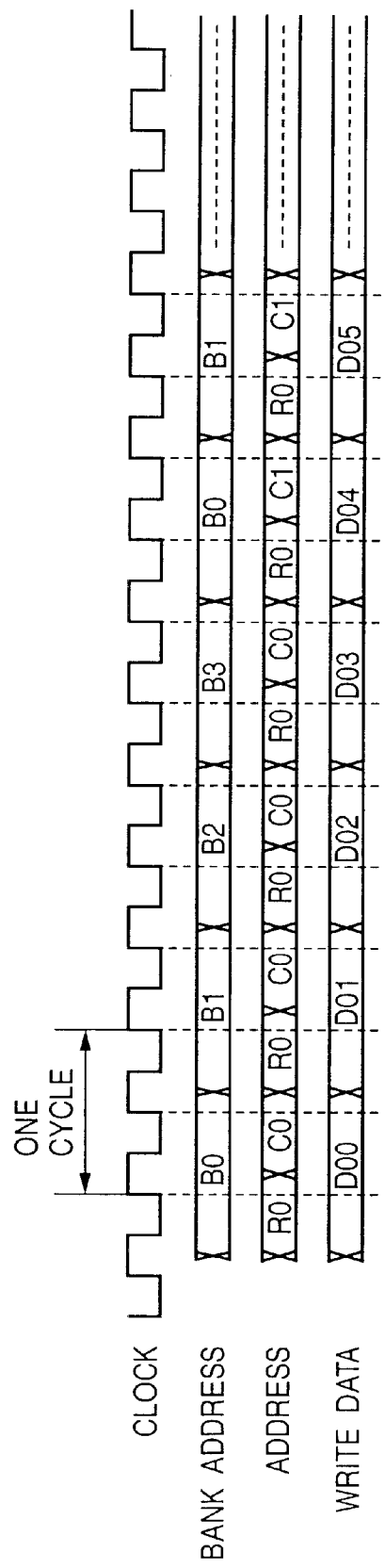
FIG. 3 is a timing chart showing the timings of access to a memory.

The write and read actions to the memory 3 are controlled by the memory controller 4. Image data is written at write timings shown in a timing chart of FIG. 3. As shown in FIG. 3, one cycle includes two clock periods, and one image data is written in one address of the memory 3 every two clocks.

BANK ADDRESS shown in FIG. 3 is a signal for selecting the four banks of the memory 3. This signal switches the banks in the order of bank 0 (B0), bank 1 (B1), bank 2 (B2), bank 3 (B3), bank 0 (B0), . . . .

Each address of the memory 3 is composed of a ROW address and COL address. The ROW address is set by the first-half clock (the first one of two clock signals) in one cycle. The COL address is set and data write is performed by the last-half clock (the last one of the two clock signals). The ROW addresses are represented by R0, R1, . . . , and the COL addresses are represented by C0, C1, . . . .

As addresses corresponding to the whole memory space of the memory 3, the ROW address is the most significant address, the COL address is the next, and the bank address is the least significant address. An address generating method during write control is as follows. For banks 0 to 3, a write operation is performed in the same ROW address and the same COL address, and the COL address is incremented after that. The ROW address and the same COL address are kept controlled while the banks are switched. In the next cycle in which the COL address reaches its upper limit, the ROW address is incremented, and the COL address is returned to its initial value. After the ROW address is incremented, the COL address is similarly incremented to control the memory write process.

A high-speed memory write operation is possible by thus writing in the ROW and COL addresses while switching the banks. Referring to FIG. 3, WRITE DATA D00 indicates data of the first pixel (0th pixel) of the 0th line in the effective image data. The order of this data is D01, D02, . . . .

Figure 4:
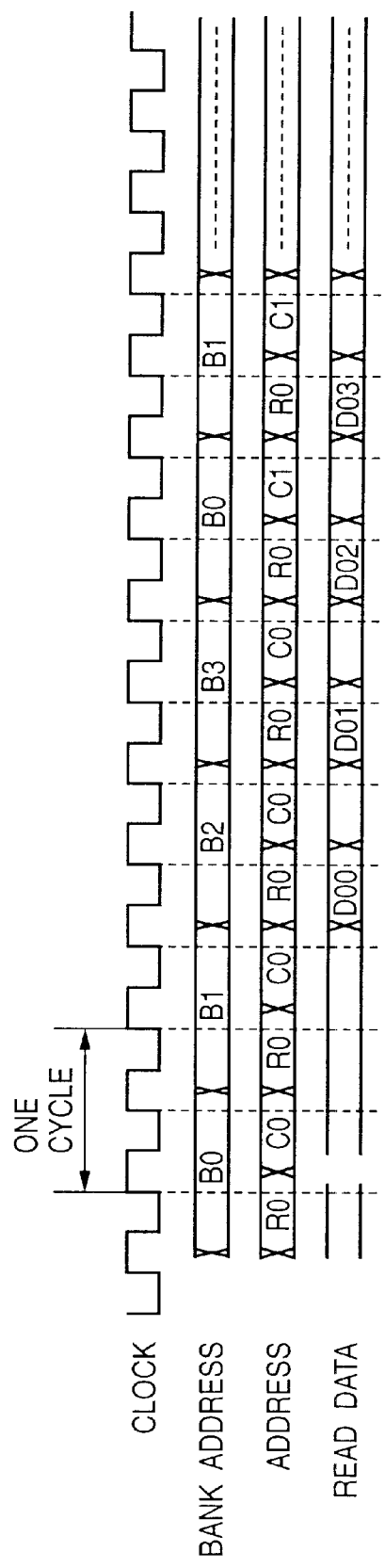
FIG. 4 is a timing chart showing the timings of access to the memory.

When the original image data is completely written in the memory 3, the controller 8 controls the memory controller 4 to read out the stored image data from the memory 3. FIG. 4 is a timing chart during memory read. This read control is performed similar to write control; one data is read out during two clock periods in accordance with the sub-scan sync signal, main-scan sync signal, bank address, and ROW and COL addresses.

Also, the output timing of the read data is delayed three clocks by the latency of the SDRAM used.

The output image data from the memory 3 is input, together with the main- and sub-scan sync signals output from the memory controller 4 and indicating the effective region of the image data, to the luminance-density converter 5. This luminance-density converter 5 performs known luminance-density conversion (logarithm conversion) to form density data. The output density data from the luminance-density converter 5 is input to the gamma correction unit 6. This gamma correction unit 6 performs gamma correction matching the tone characteristics of the printer 7 in the subsequent stage. The output gamma-corrected density data from the gamma correction unit 6 is input to the printer 7 which prints out this gamma-corrected density data.

Relationship etween Image Data, Bank Addresses, and Printing Operation

Figure 5:
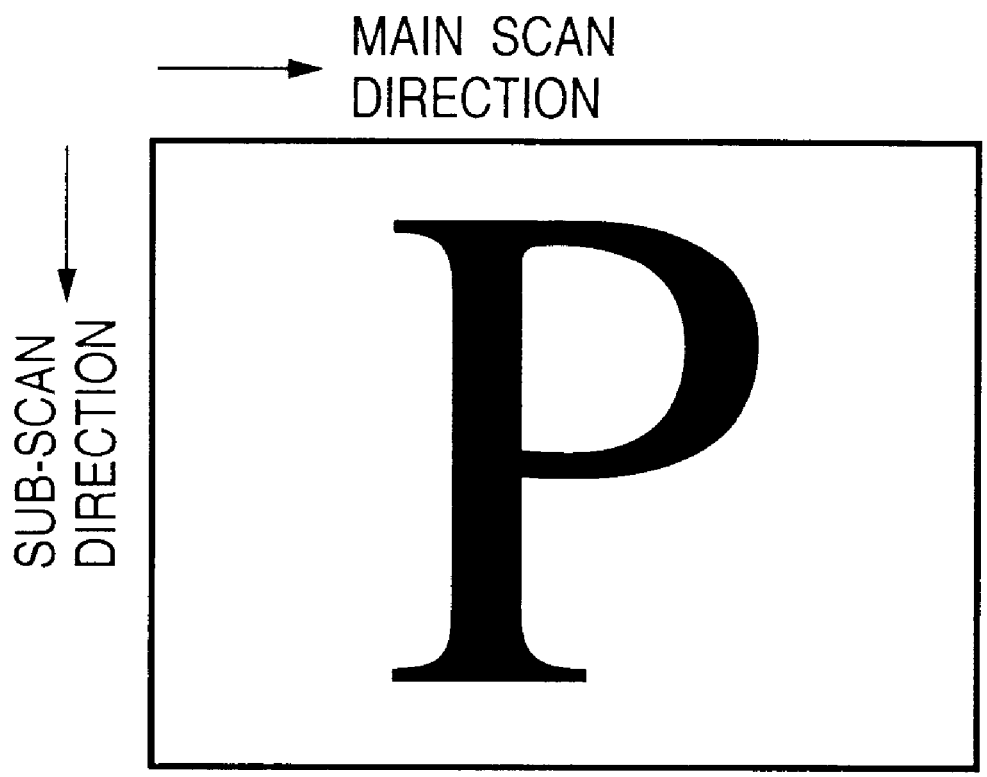
FIG. 5 is a view showing the arrangement of an original image.
Figure 6:
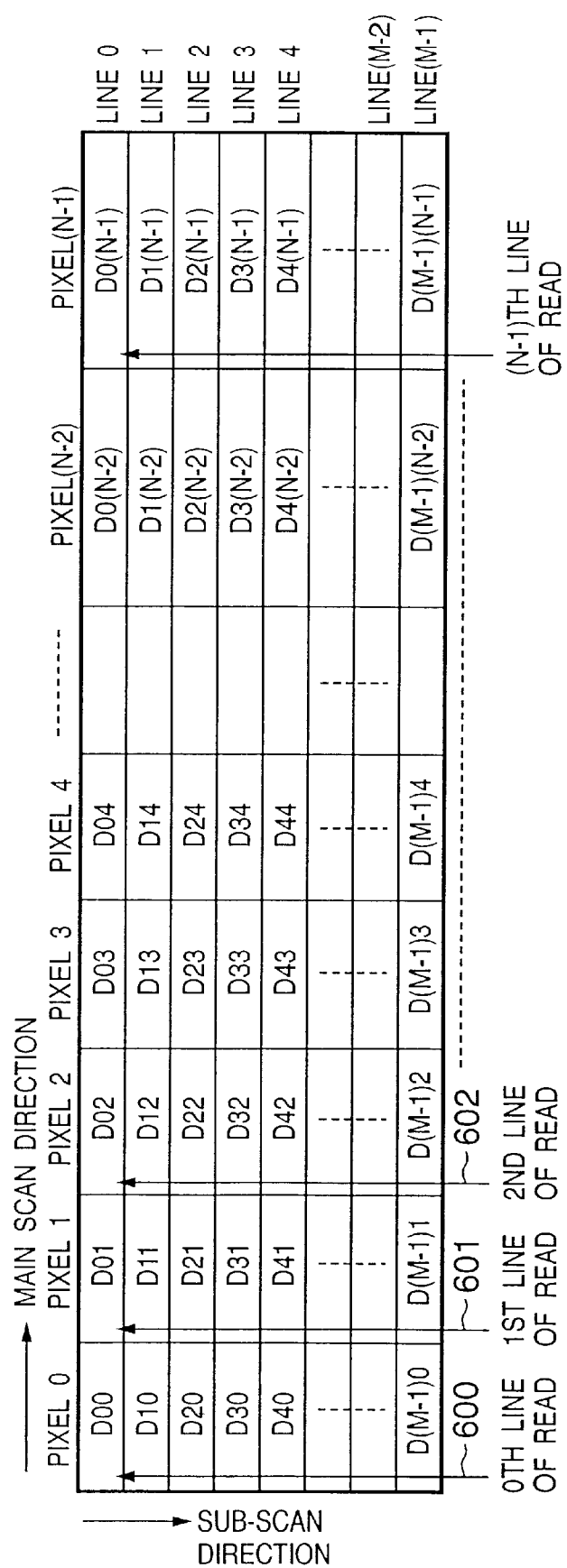
FIG. 6 is a view showing the arrangement of pixel data corresponding to the original.

Details of the relationship between image data to be written in the memory 3 and bank addresses, a normal printing operation, and a rotational printing operation will be described below. FIG. 5 shows an original image read by the original reader 1. FIG. 6 shows a data arrangement corresponding to the pixel positions in the original image. In the image shown in FIG. 5, the horizontal direction is the main scan direction, and the vertical direction is the sub-scan direction.

Figure 7:
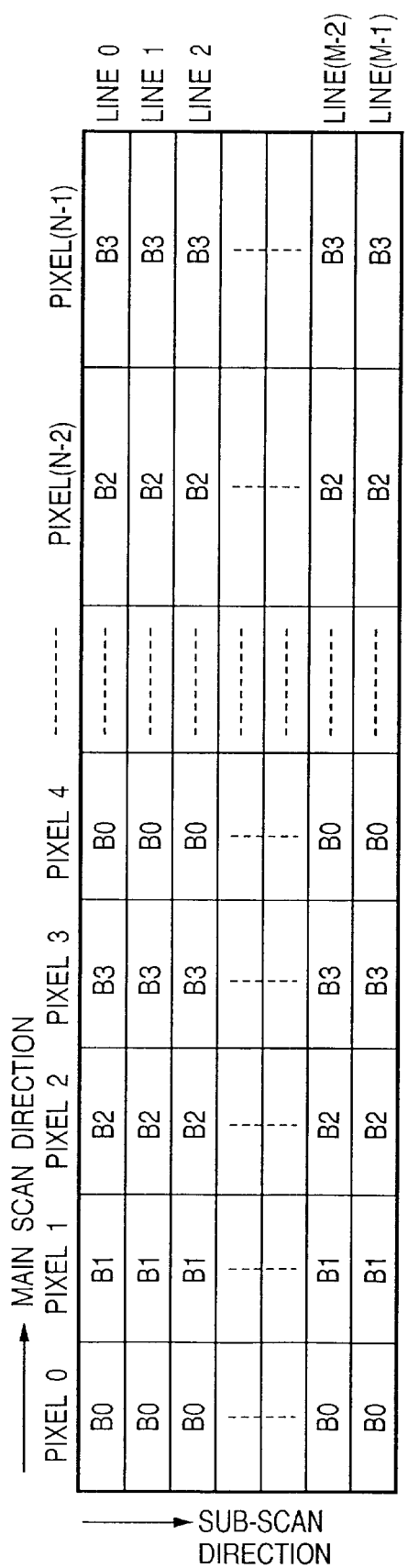
FIG. 7 is a view showing the arrangement of bank addresses.

FIG. 7 shows the bank address arrangement in the memory 3 which corresponds to the data arrangement in an original image when the effective pixel count N in the main scan direction is N=4×K (K is a natural number). As shown in FIG. 7, band addresses are sequentially arranged in the main scan direction (horizontal direction) of the image, but the same bank addresses are arranged in the sub-scan direction (vertical direction).

Figure 8:
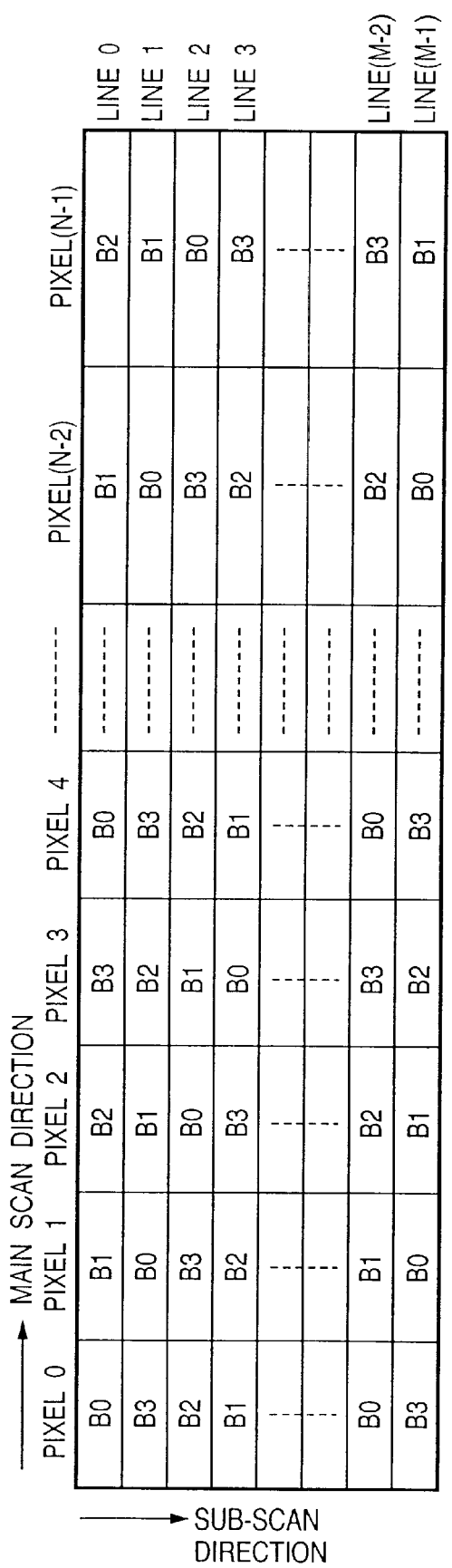
FIG. 8 is a view showing the arrangement of bank addresses.

FIG. 8 shows the bank address arrangement in the memory 3 which corresponds to the data arrangement of an original image when the effective pixel count N in the main scan direction is N=4×K+3 (K is a natural number). As shown in FIG. 8, bank addresses are sequentially arranged in the main scan direction of the image, and bank addresses in the sub-scan direction are also switched.

Figure 9:
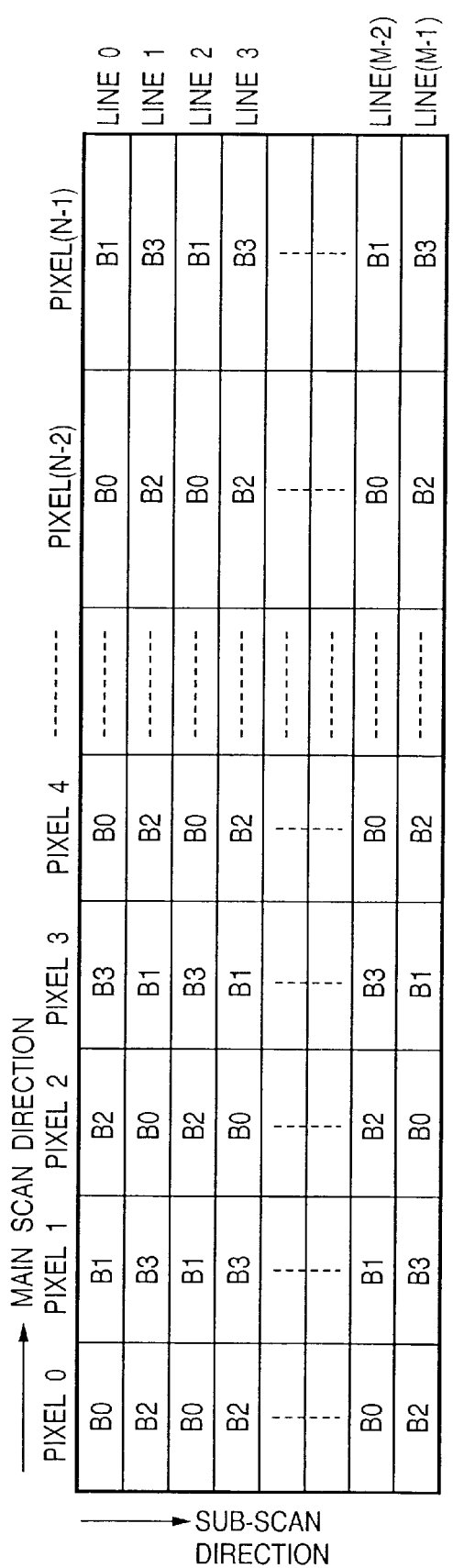
FIG. 9 is a view showing the arrangement of bank addresses.

FIG. 9 shows the bank address arrangement in the memory 3 which corresponds to the data arrangement in an original image when the effective pixel count N in the main scan direction is N=4×K+2 (K is a natural number). As shown in FIG. 9, bank addresses are sequentially arranged in the main scan direction of the image, but the same bank addresses are alternately arranged in the sub-scan direction.

Figure 10:
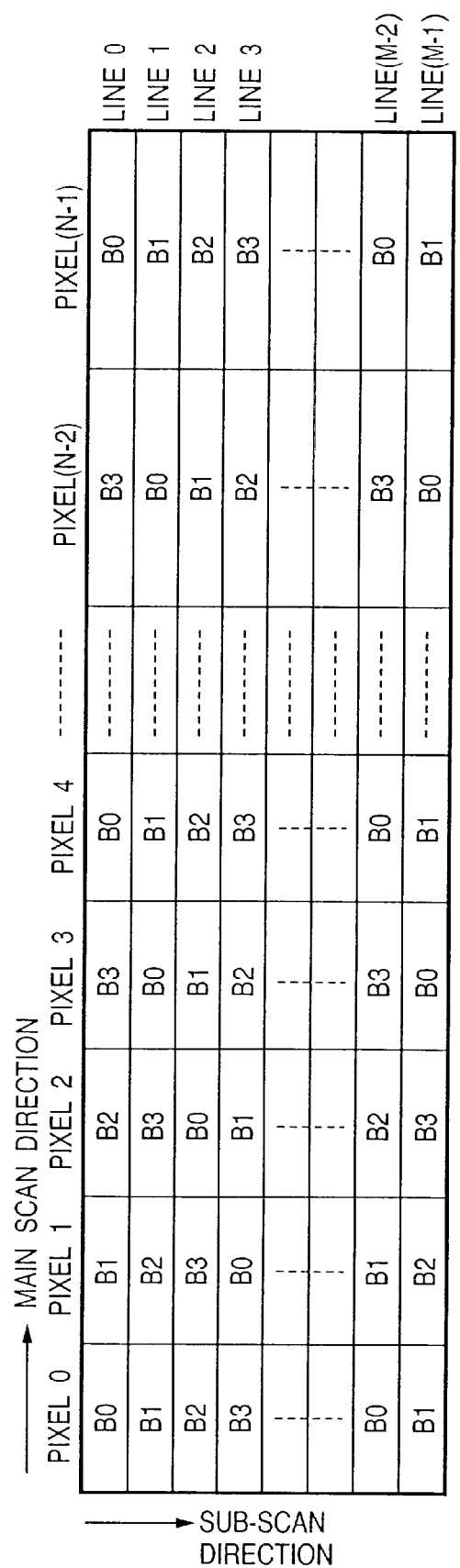
FIG. 10 is a view showing the arrangement of bank addresses.

FIG. 10 shows the bank address arrangement in the memory 3 which corresponds to the data arrangement of an original image when the effective pixel count N in the main scan direction is N=4×K+1 (K is a natural number). As shown in FIG. 10, bank addresses are sequentially arranged in the main scan direction of the image, and bank addresses in the sub-scan direction are also switched.

Normal Printing Operation

First, a normal printing operation by which an original image is directly read out and printed without being rotated will be explained below.

In this normal printing, data read from the memory 3 is performed by an address generation method analogous to the address generation in write operation corresponding to the address arrangements shown in FIGS. 7, 8, 9, and 10. This eliminates the need to continuously access the same bank of the memory 3. That is, bank access is performed by switching the banks in the order of bank 0, bank 1, bank 2, bank 3, bank 0, . . . Since this allows high-speed memory access, high-speed print output can be obtained.

90°-rotated Printing Operation

Next, an operation of printing image data by rotating an original through 90° will be explained. Printing by which an original is rotated 90° is performed when 90°-rotated printing is designated from an operation unit (not shown), or when an automatic rotation mode is set. An operation when the automatic rotation mode is set will be described below.

When this automatic rotation mode is set, the controller 8 discriminates original size information output from the original reader 1, and checks whether a printing sheet matching the discriminated original size is set in the printer 7. If no printing sheet matching the original size is set in the printer 7 and a printing sheet matching a size obtained by rotating the original size through 90° is set, the controller 8 selects this sheet as a printing sheet and so controls the operation as to print out image data, obtained by rotating the original image through 90°, onto the selected sheet.

A practical example in which a printing operation is performed by rotating an original image through 90° is an operation in which when a printing sheet (e.g., A4) corresponding to an original size sensed by the original reader 1 is not set in the printer 7 but a 90°-rotated printing sheet (e.g., A4R) is set, image data obtained by rotating the original image through 90° is automatically output onto the 90°-rotated printing sheet (A4R).

Figure 11:
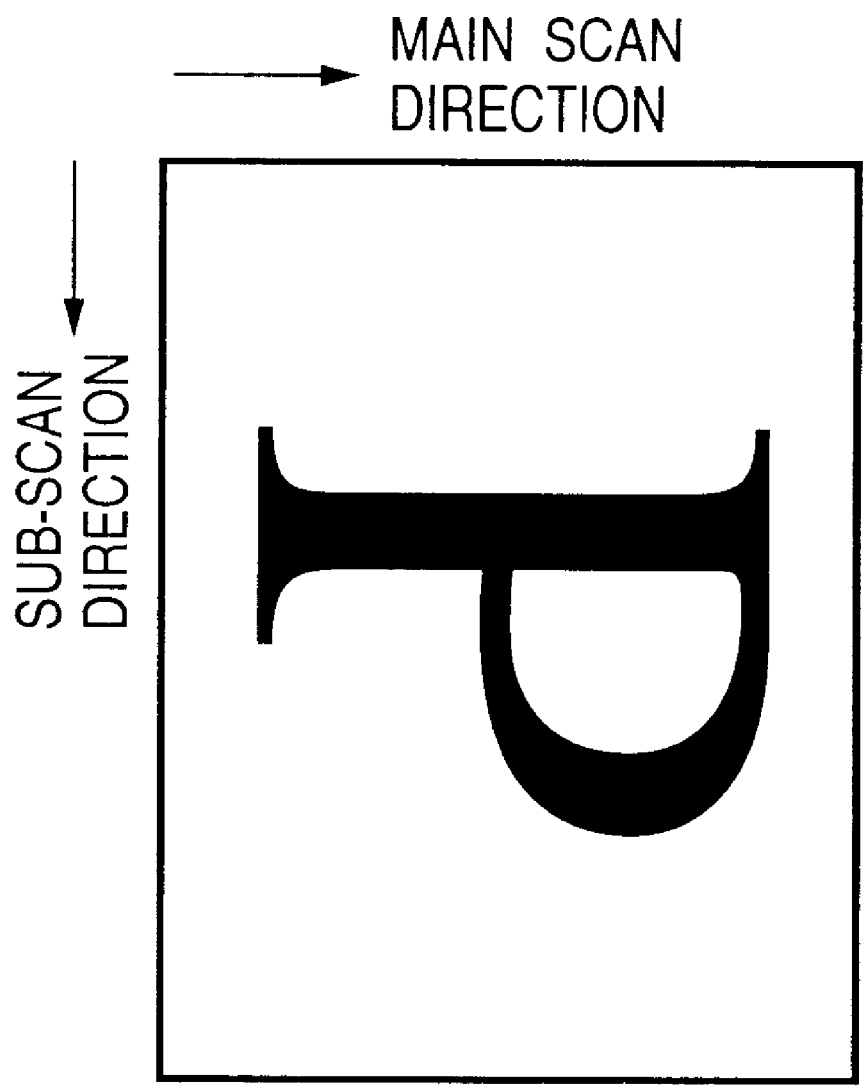
FIG. 11 is a view showing image data when the original image is rotated 90°.
Figure 12:
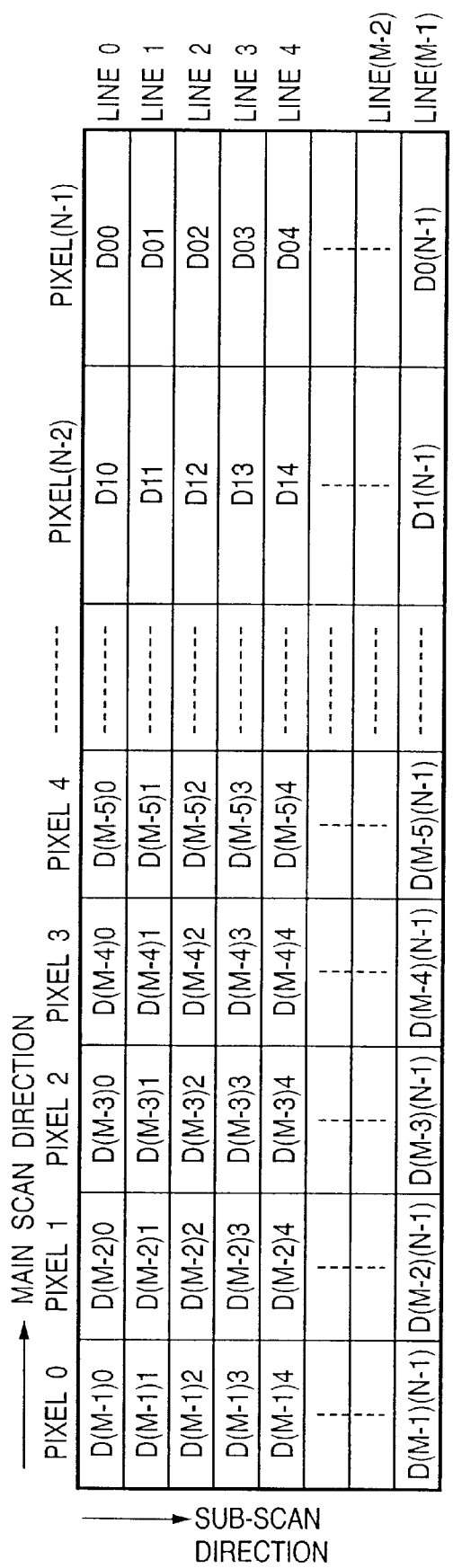
FIG. 12 is a view showing the arrangement of pixel data when the original image is rotated 90°.

FIG. 11 shows an image output from the printer by rotating the original image shown in FIG. 5 through 90°. FIG. 12 is a view showing the arrangement of image data, on the printing sheet, corresponding to the pixel positions. The arrangement of the original image data written in the memory 3 takes the address arrangement shown in FIG. 6. Therefore, the sequence of addresses accessed when the original image data rotated 90° clockwise differs from the address sequence when the data is written in the memory.

When 90°-rotated printing is to be performed, the order of read from the memory 3 is, as indicated by arrows in FIG. 6, the first line (arrow 601), the second line (arrow 602), . . . , from the 0th line (arrow 600) of read.

The control of a write operation to the memory 3 when printing by which an original image is rotated 90° is performed will be explained with reference to a flow chart in FIG. 13.

Write Operation Control

When an original image is to be printed as it is rotated 90°, the controller 8 calculates the size of the original image from original size information output from the original reader 1, and calculates the effective pixel count (N) in the main scan direction and the effective line count (M) in the sub-scan direction (S1301).

Subsequently, the controller 8 checks whether the calculated effective pixel count (N) in the main scan direction is a natural number multiple of 4, the number of banks dividing the memory 3. In other words, the controller 8 checks whether, when the image data is stored in the memory 3, as shown in FIG. 7, the bank addresses in each of pixel columns arranged in the main scan direction are the same in the sub-scan direction (S1302).

If in step S1302 the controller 8 determines that the calculated main-scan effective pixel count (N) is N=4×K (K is a natural number), the controller 8 controls the original reader 1 and the memory controller 4 by using a value N+1, obtained by adding 1 to the calculated effective pixel count N, as a new main-scan effective pixel count, thereby controlling the operation of writing the original image data into the memory 3 (S1303).

Figure 14:
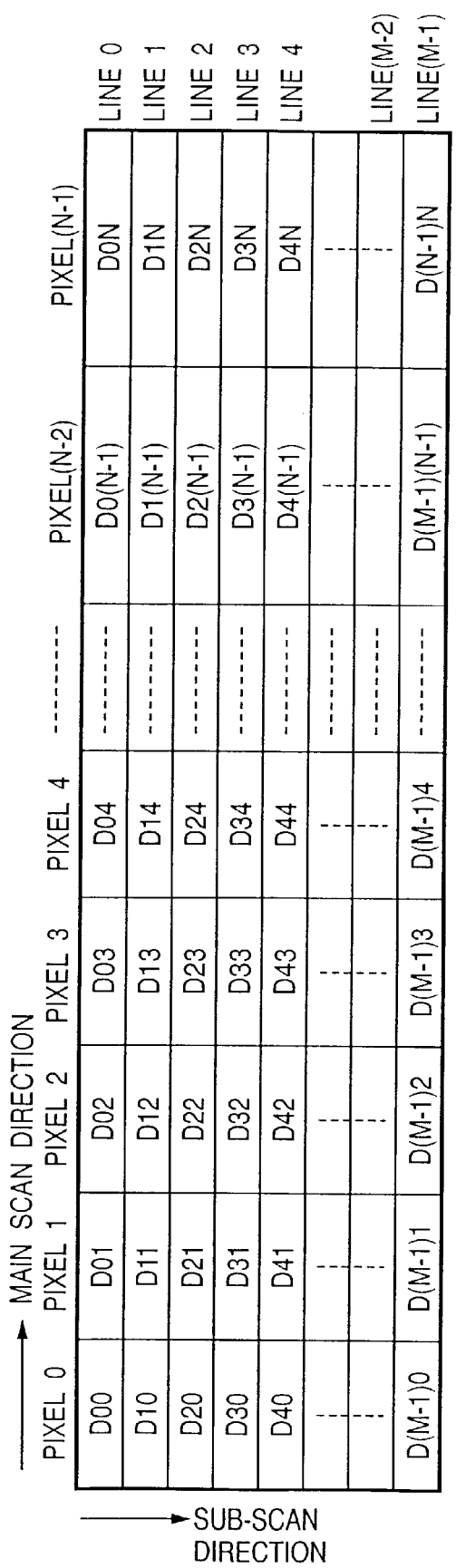
FIG. 14 is a view showing a pixel data arrangement and bank address arrangement written in the memory when 90° rotational read is to be performed.
Figure 15:
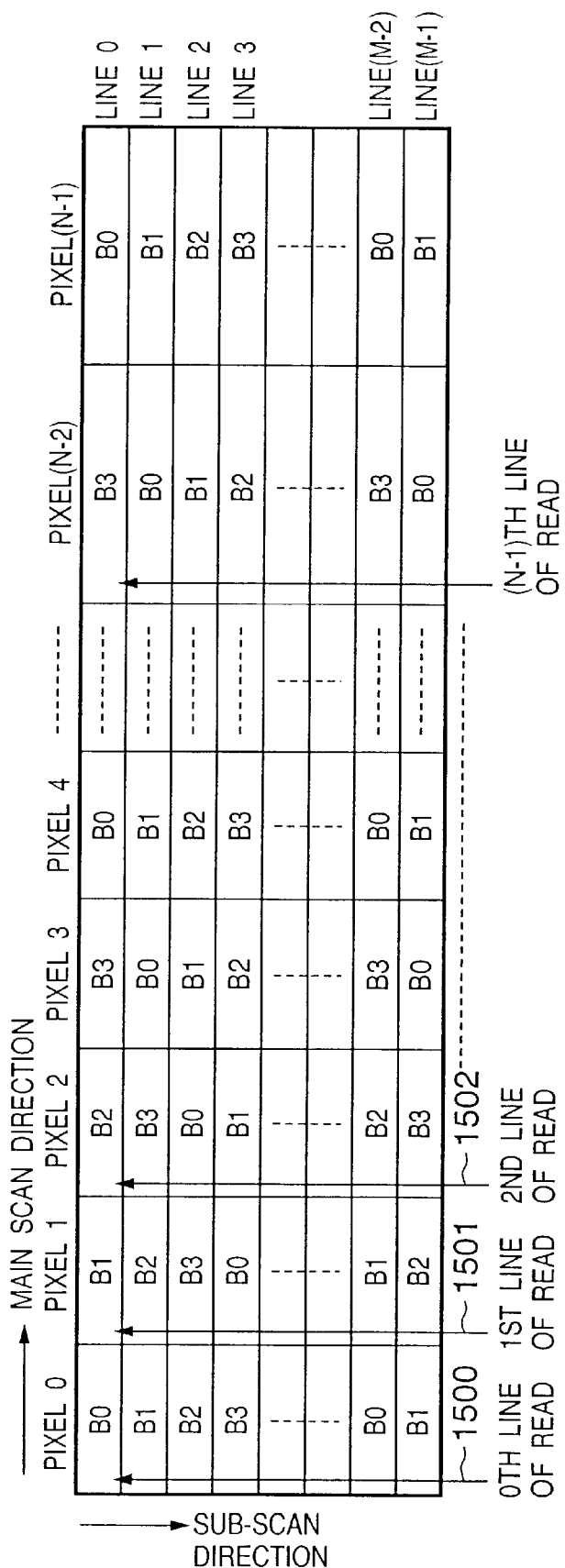
FIG. 15 is a view showing a pixel data arrangement and bank address arrangement written in the memory when 90° rotational read is to be performed.

In this case, an operation of writing N+1 pixels is performed in the main scan direction. Although invalid image data of one address is written, in the timing chart shown in FIG. 2 the invalid image data periods 200 are present between the effective image data periods indicated by the main-scan sync signal, so the time for writing this invalid image data into the memory 3 is ensured. Therefore, after the memory write of this invalid image data is completed, a write operation of image data at the head of the next line is performed with no problem. FIGS. 14 and 15 illustrate the arrangement of the image data on the memory and the arrangement of the bank addresses, respectively, when the write operation to the memory is thus performed.

The original image data written in the memory 3 with this arrangement is read out from the memory 3, as image data rotated 90°, by the controller 8. The controller 8 instructs the printer 7 to use a printing sheet suited to the 90°-rotated image data. Accordingly, the printer 7 prepares a printing operation using the designated printing sheet.

Next, the controller 8 sets, in the initial address setting unit 44 of the memory controller 4, a memory address in which D(M−1)0 (the first data of read) is stored as indicated by the image data arrangement shown in FIG. 14, controls the control signal generator 45 to set a read address direction, controls the main-scan/sub-scan sync signal generator 46 to set the main-scan effective image count: M pixels and the sub-scan effective line count: N lines, and starts reading out the image data from the memory 3 (S1304).

In this case, as shown in FIG. 15, even when 90°-rotated image read is performed, the order of bank addresses accessed during the read control is B1, B0, B3, B2, B1, B0, ... (arrow 1500), i.e., the bank addresses are switched.

Since N lines are set as the sub-scan effective line count, the operation of read from the memory 3 is completed when the (N−1)th line is read out. Although image data is stored in that area of the memory 3 which corresponds to the (N+1)th line, this image data is not read out.

On the other hand, if in step S1302 the controller 8 calculates the effective pixel count N in the main scan direction from the output original size information from the original reader 1 and determines that the calculated main-scan effective pixel count N is N=4×K+1, 4×K+2, or 4×K+3 (K is a natural number), i.e., determines that N is not a natural number multiple, the controller 8 controls the original reader 1 and the memory controller 4 to write the original image data into the memory 3, by using the calculated effective pixel count N as a main-scan effective pixel count (S1305).

In this case, the image data arrangement is similar to that shown in FIG. 6, and the bank address arrangements are as shown in FIGS. 8, 9, and 10. With respect to this image data arrangement, the controller 8 controls the printer 7 in the same manner as above. The printer 7 prepares a printing operation using the designated printing sheet.

Subsequently, the controller 8 sets, in the initial address setting unit 44 of the memory controller 4, a memory address in which image data: D(M−1)0 is stored in FIG. 6, controls the control signal generator 45 to set the read address direction, controls the main-scan/sub-scan sync signal generator 46 to set the main-scan effective image count: M pixels and the sub-scan effective line count: N lines, and starts reading out the image data from the memory 3 (S1304).

Even when image data is rotated 90°, the bank address arrangements are as shown in FIGS. 8, 9, and 10. Therefore, the bank addresses are inevitably switched when the 90°-rotated image data is read out.

In the memory control for writing/reading out data into/from the memory as described above, when an original image is to be printed as it is rotated 90°, the controller 8 performs control such that the calculated effective pixel count (N) in the main scan direction is N≠4×K (K is a natural number), i.e., N is not a natural number. Consequently, the bank addresses written in the memory 3 are not the same in the sub-scan direction, unlike in FIG. 7. Therefore, when image data is read out as it is rotated 90°, the same bank address is not continuously accessed.

Note that a bank address accessed last by scan in the main scan direction is sometimes the same as a bank address accessed first in the next scan in the main scan direction. As described previously, however, a plurality of invalid pixel regions are always contained between the last pixel in one main-scan effective period and the first pixel in the next main-scan effective period (FIG. 2), in both data write and data read to the memory. During the period of these regions, therefore, memory access need not be continuously performed. Accordingly, even when the same bank is continuously accessed, the access time is sufficiently long.

Also, in the above embodiment the operation when the automatic rotation mode is set is explained. However, it is obvious that even when the scanner designates 90°-rotated printing, image data is similarly read out from the memory 3 without continuously accessing the same bank address.

Second Embodiment

In the first embodiment, a controller 8 controls the operations of an initial address setting unit 44, a control signal generator 45, and a main-scan/sub-scan sync signal generator 46, thereby indirectly controlling access to the banks of a memory 3.

This memory access control function performed by the controller 8 can also be executed by the initial address setting unit 44, the control signal generator 45, and the main-scan/sub-scan sync signal generator 46 in a memory controller 4.

When this is the case, the controller 8 functions as an image input/output controller for controlling image input from an original reader 1 and image output from a printer 7. The only operation that the controller 8 performs for the memory controller 4 is to notify effective pixel count information of read image data.

The control of a write operation to the memory 3 when an original image is to be printed as it is rotated 90° will be explained below with reference to a flow chart in FIG. 16.

When an original image is to be printed as it is rotated 90°, the controller 8 calculates the size of the original image from original size information output from the original reader 1, and calculates an effective pixel count (N) in the main scan direction and an effective line count (M) in the sub-scan direction (S1601).

Subsequently, the controller 8 checks whether the calculated effective pixel count (N) in the main scan direction is a natural number multiple of 4, the number of banks dividing the memory 3 (S1602).

If in step S1602 the controller 8 determines that the calculated main-scan effective pixel count (N) is N=4×K (K is a natural number), the controller 8 controls the original reader 1 by using a value N+1, obtained by adding 1 to the calculated effective pixel count N, as a new main-scan effective pixel count, controls the memory controller 4 to start writing, and also notifies the memory controller 4 that the main-scan effective pixel count is N+1 (S1603).

In the memory controller 4 given the notification from the controller 8, the initial address setting unit 44, the control signal generator 45, and the main-scan/sub-scan sync signal generator 46 control the operation of write of the original image data to the memory 3, by using N+1 as the main-scan effective pixel count and M as the pixel count in the sub-scan direction.

The original image data written in the memory 3 is read out from the memory, as image data rotated 90°, by the controller 8. The controller 8 instructs the printer 7 to use a printing sheet suited to the 90°-rotated image data. Accordingly, the printer 7 prepares a printing operation using the designated printing sheet.

Next, the controller 8 instructs the memory controller 4 to start reading. In the memory controller 4, the initial address setting unit 44 sets a memory address, the control signal generator 45 sets a read address direction, and the main-scan/sub-scan sync signal generator 46 sets the main-scan effective image count: M pixels and the sub-scan effective line count: N+1 lines, thereby starting reading out the image data from the memory 3 (S1604).

On the other hand, if in step S1602 the controller 8 calculates the effective pixel count N in the main scan direction from the output original size information from the original reader 1 and determines that the calculated main-scan effective pixel count N is N=4×K+1, 4×K+2, or 4×K+3 (K is a natural number), i.e., determines that N is not a natural number multiple, the controller 8 controls the original reader 1 by using the calculated effective pixel count N as a main-scan effective pixel count, and notifies the memory controller 4 that the main-scan effective pixel count is N (S1605).

The controller 8 controls the printer 7 in the same manner as above. The printer 7 prepares a printing operation using the designated printing sheet.

Subsequently, the controller 8 instructs the memory controller 4 to start reading. The memory controller 4 starts reading out the image data from the memory 3 in the same way as above (S1604).

In this embodiment as described above, the memory access control function performed by the controller 8 in the first embodiment is executed by the initial address setting unit 44, the control signal generator 45, and the main-scan/sub-scan sync signal generator 46 in the memory controller 4.

The controller 8 functions as an image input/output controller for controlling image input from the original reader 1 and image output from the printer 7. Also, the controller 8 notifies the memory controller 4 of the effective pixel count information of read image data.

This distributes the load of the CPU and obviates the need to exchange complicated signals between the controller and the memory controller. Therefore, even when the memory 3 and the memory controller 4 are units separated from the copying apparatus, it is readily possible to realize a rotational output function capable of high-speed read.

Third Embodiment

In the first embodiment described above, when the controller 8 determines that the calculated main-scan effective pixel count (N) is N=4×K (K is a natural number), the controller 8 controls the image reader 1 and memory controller 4 using as a new main-scan effective pixel count a value N+1 obtained by adding 1 to the calculated effective pixel count N, thereby controlling the write operation to the memory 3 for the original image data.

In the second embodiment described above, when the controller 8 determines that the calculated main-scan effective pixel count (N) is N=4×K (K is a natural number), the controller 8 controls the image reader 1 using as a new main-scan effective pixel count a value N+1 obtained by adding 1 to the calculated effective pixel count, instructs the memory controller 4 to start write operation, and notifies the memory controller 4 of the main-scan effective pixel count as N+1.

However, the relationship between the write address of the main-scan final effective image data and the write address of the next main-scan start effective image data may be controlled without changing the main-scan effective pixel count N.

The third embodiment will exemplify a change in sum in calculating the write address of the next main-scan start effective image data with respect to the write address of the main-scan final effective image data.

Changes from the flow chart of the first embodiment in FIG. 13 will be described below.

Figure 13:
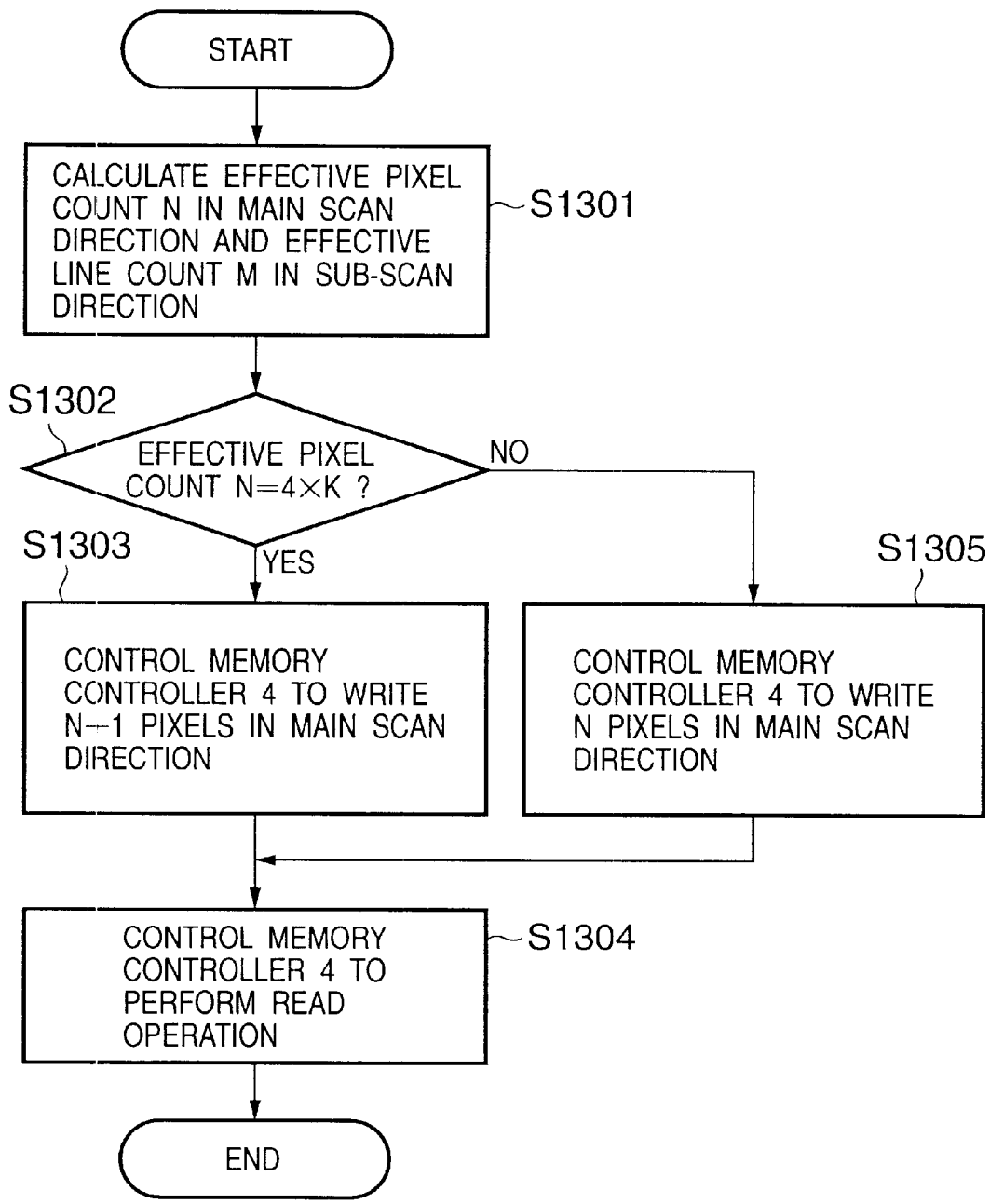
FIG. 13 is a flow chart for explaining a rotational printing process in the first embodiment.

In step S1305 executed when the effective pixel count is not N=4×K in step S1302 of FIG. 13, a memory controller 4 controls the write address of the memory such that an address obtained by adding "1" to the write address of the main-scan final effective image data serves as the write address of the next main-scan start effective image data.

In step S1303 executed when the effective pixel count is N=4×K in step S1302, the memory controller 4 controls the write address of the memory such that an address obtained by adding "2" to the write address of the main-scan final effective image data serves as the write address of the next main-scan start effective image data.

As described above, since the least significant address for the entire memory space serves as the bank address, continuous write for the same bank address in the sub-scan direction can be prevented even for the effective pixel count N=4×K by setting the sum to the write address to "2".

The sum for calculating the write address of the next main-scan start effective image data with respect to the write address of the main-scan final effective image data may be notified from a controller 8 to the memory controller 4.

The controller 8 notifies the memory controller 4 of "1" as the sum when the calculated main-scan effective pixel count (N) is not N=4×K (K is a natural number) and "2" as the sum when the calculated main-scan effective pixel count (N) is N=4×K (K is a natural number). Based on the notified sum, the memory controller 4 calculates the write address of the next main-scan start effective image data in accordance with the write address of the main-scan final effective image data and can control the write operation to the memory.

This arrangement can easily be implemented by changing the flow chart of the second embodiment in FIG. 16. That is, in step S1603, the controller 8 notifies the memory controller 4 of "2" as the sum. In step S1604, the memory controller 4 receives this sum and controls the write operation to the memory.

Even if the effective pixel count is N=4×K, continuous write for the same bank address in the sub-scan direction can be prevented.

The sum C in steps S1303 and S1603 is a value satisfying C (2≦C≦B, B:the number of banks, C: natural number) and may be "3" or "4".

As described above, according to this embodiment, the relationship between the write address of the main-scan final effective image data and the write address of the next main-scan start effective image data is controlled without changing the effective pixel count for write. Excess write operations can be prevented. Even if the invalid pixel regions shown in FIG. 2 are not present, continuous write for the same bank address in the sub-scan direction can be prevented.

Other Embodiments

When 90° rotation control is performed in the first embodiment, 1 is added to the main-scan effective pixel count N if this main-scan effective pixel count N is N=4×K (K is a natural number). However, the value to be added can also be 2 or 3. Even if this value is 2 or 3, no continuous access to the same bank address occurs when 90° rotational read is performed. In this case, a write operation of N+2 or N+3 pixels need only be performed in steps S1303 and S1603 of the flow charts shown in FIGS. 13 and 16.

In addition, as to a limitation on access to bank addresses of a memory having a plurality of banks, the longer the interval of access to the same bank, the higher the memory access speed. Therefore, the memory access speed is higher in alternate access to four banks than in alternate access to two bank addresses.

Accordingly, when a memory having four banks is used, if a memory address N in the main scan direction is N=4×K or 4×K+2 (K is a natural number), the memory access speed can be increased by changing to N=4×K+1 or 4×K+3 (K is a natural number) When this is the case, whether effective pixel count N=4×K+2 need only be checked in steps S1302 and S1602 of the flow charts shown in FIGS. 13 and 16.

In each of the above embodiments, an SDRAM having a memory area of four banks has been explained. However, the number of banks of the memory is not restricted to four, and the present invention is obviously applicable to an apparatus using a memory having a plurality of banks.

Accordingly, a general expression of the effective pixel count (N) in the main scan direction, as a condition by which invalid pixels are added to the main-scan effective pixel count, can be represented as N=B×K or N=B×K+B/2 (K: natural number, B: the number of banks).

Furthermore, in each of the above embodiments, data written in the memory is read out as it is rotated 90°. However, the present invention is similarly applicable to a case in which data is read out as it is rotated −90°.

Also, in each of the above embodiments, data written in the memory is read out as it is rotated 90°. However, the present invention is readily applicable to a case in which data is read out in an address sequence different from that of data write.

The present invention can be applied not only to a copying apparatus but also to another image input/output apparatus. Examples are a system which outputs an image scanned by a scanner to a display, and image outputting performed by a separate printer in accordance with an output instruction from a host. The present invention can also be applied to remote copying performed via a network by using a plurality of copying apparatuses.

The memory control apparatus and method can prevent excess write operations during memory write and continuous access from the same bank during memory read. High-speed data access is allowed in, e.g., rotation control of original image data.

The image input/output control apparatus and information notification method according to the present invention can prevent excess write operations during memory write and continuous access from the same bank during memory read without complex signal exchange with the memory control apparatus. High-speed data access is facilitated even in, e.g., rotation control of original image data.

The present invention has been explained by way of its preferred embodiments. However, the present invention is not limited to the above embodiments and can be variously modified within the scope of the claims.

What is claimed is:

1. A memory control apparatus for writing image data into a memory having a plurality of banks by interleaving, and reading out the image data from said memory in an address sequence different from the address sequence of write, comprising:

calculating means for calculating an effective pixel count (N) in a horizontal direction of original image data;

determining means for determining whether the effective pixel count (N) calculated by said calculating means is a natural number multiple of the number (B) of said banks; and write control means for performing control such that original image data to which invalid image data is added in the horizontal direction is written in said memory, if said determining means determines that the effective pixel count (N) is a natural number multiple of the number (B) of said banks.

2. The apparatus according to claim 1, wherein said write control means controls an address count (M) in the horizontal direction, when the original image data is written in said memory, such that $$M=B \times K+C, 1 \leq C<B$$

(K, C: natural number, B: the number of banks) by adding invalid pixels.

3. The apparatus according to claim 1, wherein the original image data is rotated −90° or +90° by reading out the image data written in said memory in a sequence different from the sequence of write.

4. The apparatus according to claim 1, wherein bank addresses generated by said write control means are not consecutive addresses in the same bank during rotation control.

5. The apparatus according to claim 1, wherein the original image data is read image data read by an original reader, the horizontal direction is a main scan direction of reading by said image reader, and a vertical direction is a sub-scan direction of reading by said image reader.

6. A memory control apparatus for writing image data into a memory having a plurality of banks by interleaving, and reading out the image data from said memory in an address sequence different from the address sequence of write, comprising:

calculating means for calculating an effective pixel count (N) in a horizontal direction of original image data;

determining means for determining whether the effective pixel count (N) calculated by said calculating means satisfies a relation N=B×K+B/2 (K: natural number, B: the number of banks); and write control means for performing control such that original image data to which invalid image data is added in the horizontal direction is written in said memory, if said determining means determines that the relation N=B×K+B/2 holds.

7. A memory control apparatus for writing image data into a memory having a plurality of banks by interleaving, and reading out the image data from said memory in an address sequence different from the address sequence of write, comprising:

determining means for determining, when original image data is written in said memory, whether bank addresses in each of pixel columns arranged in a horizontal direction are the same in a vertical direction; and address control means for performing address control, if said determining means determines that bank addresses in each of the pixel columns arranged in the horizontal direction are the same in the vertical direction, such that the original image data is written while the bank addresses are switched in the vertical direction.

8. An image input/output control apparatus which is connected to a memory control apparatus for writing image data into a memory having a plurality of banks by interleaving, and reading out the image data from said memory in an address sequence different from the address sequence of write, and which notifies said memory control apparatus of information for accessing said memory, comprising:

calculating means for calculating an effective pixel count (N) in a horizontal direction of original image data;

determining means for determining whether the effective pixel count (N) calculated by said calculating means is a natural number multiple of the number (B) of said banks; and notifying means for notifying said memory control apparatus that the pixel count in the horizontal direction of the original image data is N+C (1≦C<B, C: natural number), if said determining means determines that the effective pixel count (N) is a natural number multiple of the number (B) of said banks.

9. A copying apparatus having:

a reader for reading image data;

a synchronous DRAM for storing the image data read by said reader into B banks;

a memory controller for rotating image data through +90° or −90° by sequentially writing the image data into a memory having a plurality of banks in the main scan direction by interleaving, and reading out the image data from said memory in an address sequence different from the address sequence of write; and an output unit for printing out the image data rotated +90° or −90° by said memory controller, comprising:

calculating means for calculating an effective pixel count (N) in a main scan direction of read image data read by said reader;

determining means for determining whether the effective pixel count (N) calculated by said calculating means satisfies a relation N=B×K (K is a natural number), as to the number (B) of banks of a synchronous DRAM; and access control means for controlling memory access to said memory controller, if said determining means determines that the effective pixel count (N) satisfies the relation N=B×K (K is a natural number), such that the read image data is stored in said synchronous DRAM while C (1≦C<B, C: natural number) invalid pixels are added to an end of the read image data.

10. A copying apparatus having:

a reader for reading image data;

a synchronous DRAM for storing the image data read by said reader into B banks;

a memory controller for rotating image data through +90° or −90° by sequentially writing the image data into a memory having a plurality of banks in the main scan direction by interleaving, and reading out the image data from said memory in an address sequence different from the address sequence of write; and an output unit for printing out the image data rotated +90° or −90° by said memory controller, comprising:

calculating means for calculating an effective pixel count (N) in a main scan direction of read image data read by said reader;

determining means for determining whether the effective pixel count (N) calculated by said calculating means satisfies a relation N=B×K+B/2 (K is a natural number), as to the number (B) of banks of a synchronous DRAM; and access control means for controlling memory access to said memory controller, if said determining means determines that the effective pixel count (N) satisfies the relation N=B×K+B/2 (K is a natural number), such that the read image data is stored in said synchronous DRAM while C (1≦C<B, C: natural number) invalid pixels are added to an end of the read image data.

11. A memory control method of writing image data into a memory having a plurality of banks by interleaving, and reading out the image data from said memory in an address sequence different from the address sequence of write, comprising:

the calculation step of calculating an effective pixel count (N) in a horizontal direction of original image data;

the determination step of determining whether the effective pixel count (N) calculated in the calculation step is a natural number multiple of the number (B) of said banks; and the write control step of performing control such that original image data to which invalid image data is added in the horizontal direction is written in said memory, if it is determined in the determination step that the effective pixel count (N) is a natural number multiple of the number (B) of said banks.

12. The method according to claim 11, wherein the write control step comprises controlling an address count (M) in the horizontal direction, when the original image data is written in said memory, such that $$M=B\times K+C, 1\leq C<B$$

(K, C: natural number, B: the number of banks) by adding invalid pixels.

13. The method according to claim 11, wherein the original image data is rotated −90° or +90° by reading out the image data written in said memory in a sequence different from the sequence of write.

14. The method according to claim 11, wherein bank addresses generated in the write control step are not consecutive addresses in the same bank during rotation control.

15. The method according to claim 11, wherein the original image data is read image data read by an original reader, the horizontal direction is a main scan direction of reading by said image reader, and a vertical direction is a sub-scan direction of reading by said image reader.

16. A memory control method of writing image data into a memory having a plurality of banks by interleaving, and reading out the image data from said memory in an address sequence different from the address sequence of write, comprising:

the calculation step of calculating an effective pixel count (N) in a horizontal direction of original image data;

the determination step of determining whether the effective pixel count (N) calculated in the calculation step satisfies a relation N=B×K+B/2 (K: natural number, B: the number of banks); and the write control step of performing control such that original image data to which invalid image data is added in the horizontal direction is written in said memory, if it is determined in the determination step that the relation N=B×K+B/2 holds.

17. A memory control method of writing image data into a memory having a plurality of banks by interleaving, and reading out the image data from said memory in an address sequence different from the address sequence of write, comprising:

the determination step of determining, when original image data is written in said memory, whether bank addresses in each of pixel columns arranged in a horizontal direction are the same in a vertical direction; and the address control step of performing address control, if it is determined in the determination step that bank addresses in each of the pixel columns arranged in the horizontal direction are the same in the vertical direction, such that the original image data is written while the bank addresses are switched in the vertical direction.

18. An information notification method of notifying, a memory control apparatus for writing image data into a memory having a plurality of banks by interleaving, and reading out the image data from said memory in an address sequence different from the address sequence of write, of information for accessing said memory, comprising:

the calculation step of calculating an effective pixel count (N) in a horizontal direction of original image data;

the determination step of determining whether the effective pixel count (N) calculated in the calculation step is a natural number multiple of the number (B) of said banks; and the notification step of notifying said memory control apparatus that the pixel count in the horizontal direction of the original image data is N+C (1≦C<B, C: natural number), if it is determined in the determination step that the effective pixel count (N) is a natural number multiple of the number (B) of said banks.

19. A memory control method of a copying apparatus having:

a reader for reading image data;

a synchronous DRAM for storing the image data read by said reader into B banks;

a memory controller for rotating image data through +90° or −90° by sequentially writing the image data into a memory having a plurality of banks in the main scan direction by interleaving, and reading out the image data from said memory in an address sequence different from the address sequence of write; and an output unit for printing out the image data rotated +90° or −90° by said memory controller, comprising:

the calculation step of calculating an effective pixel count (N) in a main scan direction of read image data read by said reader;

the determination step of determining whether the effective pixel count (N) calculated in the calculation step satisfies a relation N=B×K (K is a natural number), as to the number (B) of banks of a synchronous DRAM; and the access control step of controlling memory access to said memory controller, if it is determined in the determination step that the effective pixel count (N) satisfies the relation N=B×K (K is a natural number), such that the read image data is stored in said synchronous DRAM while C (1≦C<B, C: natural number) invalid pixels are added to an end of the read image data.

20. A memory control method of a copying apparatus having:

a reader for reading image data;

a synchronous DRAM for storing the image data read by said reader into B banks;

a memory controller for rotating image data through +90° or −90° by sequentially writing the image data into a memory having a plurality of banks in the main scan direction by interleaving, and reading out the image data from said memory in an address sequence different from the address sequence of write; and an output unit for printing out the image data rotated +90° or −90° by said memory controller, comprising:

the calculation step of calculating an effective pixel count (N) in a main scan direction of read image data read by said reader;

the determination step of determining whether the effective pixel count (N) calculated in the calculation step satisfies a relation N=B×K+B/2 (K is a natural number), as to the number (B) of banks of a synchronous DRAM; and the access control step of controlling memory access to said memory controller, if it is determined in the determination step that the effective pixel count (N) satisfies the relation N=B×K+B/2 (K is a natural number), such that the read image data is stored in said synchronous DRAM while C (1≦C<B, C: natural number) invalid pixels are added to an end of the read image data.

21. A memory control apparatus for writing image data into a memory having a plurality of banks by interleaving, and reading out the image data from said memory in an address sequence different from the address sequence of write, comprising:

calculating means for calculating an effective pixel count (N) in a horizontal direction of original image data;

determining means for determining whether the effective pixel count (N) calculated by said calculating means is a natural number multiple of the number (B) of said banks; and write control means for controlling a relationship between a write address of final effective image data in the horizontal direction and a write address of next start effective image data in the horizontal direction, if said determining means determines that the effective pixel count (N) is a natural number multiple of the number (B) of said banks.

22. An image input/output control apparatus which is connected to a memory control apparatus for writing image data into a memory having a plurality of banks by interleaving, and reading out the image data from said memory in an address sequence different from the address sequence of write, and which notifies said memory control apparatus of information for accessing said memory, comprising:

calculating means for calculating an effective pixel count (N) in a horizontal direction of original image data;

determining means for determining whether the effective pixel count (N) calculated by said calculating means is a natural number multiple of the number (B) of said banks; and notifying means for notifying said memory control apparatus that a sum in calculating a write address of next start effective image data in the horizontal direction is C ($2 \leq C \leq B$, C: natural number) with respect to a write address of final effective image data in the horizontal direction, if said determining means determines that the effective pixel count (N) is a natural number multiple of the number (B) of said banks.

23. A memory control method of writing image data into a memory having a plurality of banks by interleaving, and reading out the image data from said memory in an address sequence different from the address sequence of write, comprising:

the calculating step of calculating an effective pixel count (N) in a horizontal direction of original image data;

the determining step of determining whether the effective pixel count (N) calculated in the calculating step is a natural number multiple of the number (B) of said banks; and the write control step of controlling a relationship between a write address of final effective image data in the horizontal direction and a write address of next start effective image data in the horizontal direction, if it is determined in the determining step that the effective pixel count (N) is a natural number multiple of the number (B) of said banks.

24. An information notification method of notifying, a memory control apparatus for writing image data into a memory having a plurality of banks by interleaving, and reading out the image data from said memory in an address sequence different from the address sequence of write, of information for accessing said memory, comprising:

the calculating step of calculating an effective pixel count (N) in a horizontal direction of original image data;

the determining step of determining whether the effective pixel count (N) calculated in the calculating step is a natural number multiple of the number (B) of said banks; and the notifying step of notifying said memory control apparatus that a sum in calculating a write address of next start effective image data in the horizontal direction is C ($2 \leq C \leq B$, C: natural number) with respect to a write address of final effective image data in the horizontal direction, if it is determined in the determining step that the effective pixel count (N) is a natural number multiple of the number (B) of said banks.

* * * * *